R. M. FRYER.
METHOD OF OPERATING INTERNAL COMBUSTION ENGINES.
APPLICATION FILED JULY 5, 1910.

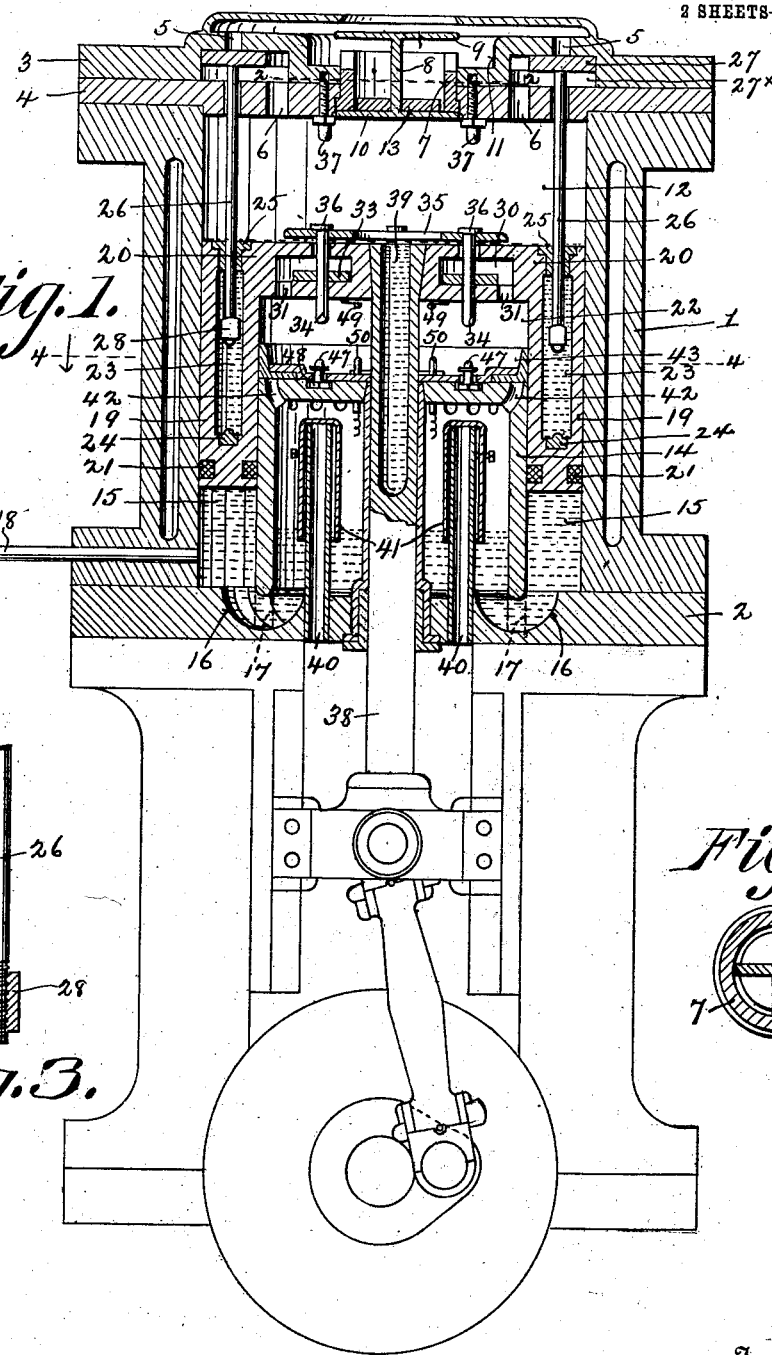

1,027,380.

Patented May 21, 1912.

2 SHEETS—SHEET 2.

Witnesses:
R. M. Elliott
Mary E. Branson

Inventor,
Robert M. Fryer

UNITED STATES PATENT OFFICE.

ROBERT M. FRYER, OF NEW YORK, N. Y., ASSIGNOR OF ONE-HALF TO FRANK B. COLMAN, OF PASSAIC, NEW JERSEY.

METHOD OF OPERATING INTERNAL-COMBUSTION ENGINES.

1,027,380. Specification of Letters Patent. Patented May 21, 1912.

Application filed July 5, 1910. Serial No. 570,379.

*To all whom it may concern:*

Be it known that I, ROBERT M. FRYER, a citizen of the United States, residing at New York, in the county of New York and State of New York, have invented certain new and useful Improvements in Methods of Operating Internal - Combustion Engines, of which the following is a specification.

This invention relates to a method of operating internal combustion engines, and is closely related to the invention which forms the subject of an application for Letters Patent filed by me for an internal combustion engine, March 4, 1910, Serial No. 547,302.

In all engines of this class, the explosive charge after having performed its function in imparting the working stroke to the piston, is exhausted into the atmosphere, and any residual energy it contains is thus lost, the compression stroke of the piston being secured by the acquired momentum of the parts.

It is the object of the present invention, in a ready and thoroughly practical manner, to utilize the heat units contained in the exploded charge to accomplish effective work on the compression stroke of the piston, whereby the latter will be subjected to practically the same pressure on both strokes, with the result that a smoother running and more powerful engine will be produced.

With the above and other objects in view, as will appear as the nature of the invention is better understood, the same consists, generally stated, in utilizing the heat units of an exploded charge to produce flash steam on the side of the piston opposite that acted upon by the gaseous compound, whereby to drive the piston on its compression stroke with practically, if not entirely, the same force and momentum as that with which it was driven on its working stroke, thus to conserve all of the heat units of the charge for doing effective work.

The invention consists further in the various steps of the method hereinafter fully described and claimed.

Figure 4:
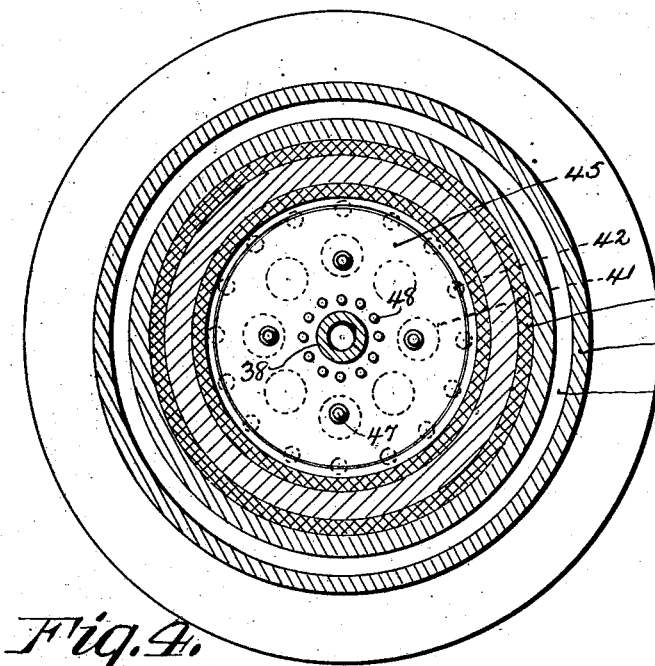
Figure 7:
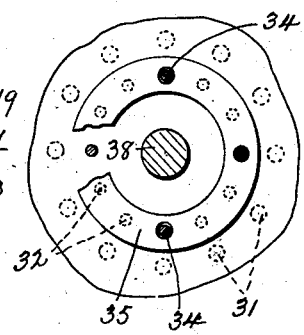
Figure 8:
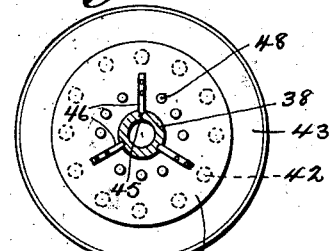
Figure 6:
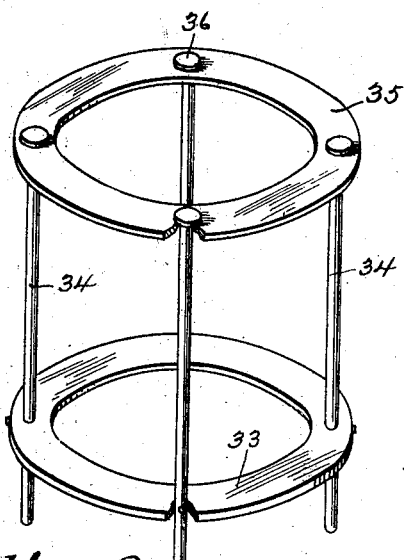
Figure 5:
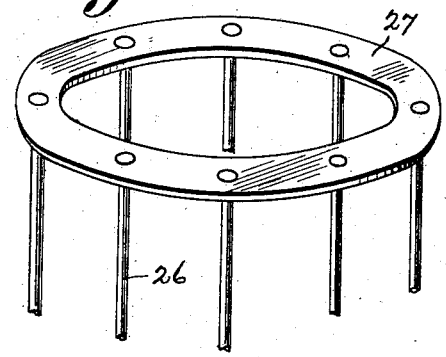

In the accompanying drawings forming a part of this specification and in which like characters of reference indicate corresponding parts: Figure 1 is a view in vertical section through an engine adapted for carrying the method into effect. Fig. 2 is a horizontal sectional view, taken on the line 2—2, Fig. 1. Fig. 3 is a detail view, partly in section, of one of the exhaust-valve operating-stems. Fig. 4 is a horizontal sectional view, taken on the line 4—4, Fig. 1. Fig. 5 is a detail view in perspective, of a portion of the exhaust-valve. Fig. 6 is a perspective detail view, partly in section, of the valve that controls passage between the combustion and steam-generating chambers. Fig. 7 is a plan view of a portion of the piston. Fig. 8 is a plan view of the valve disposed on top of the carbureter.

Referring to the drawings, and to Fig. 1 thereof, 1 designates the cylinder of the engine, the bottom end of which is closed by a head 2 forming the upper face of the base or trunk of the engine. The top end of the cylinder is closed by a head comprising two disks 3 and 4, in the former of which is provided a series of circularly arranged exhaust-ports 5 that communicate with similar ports 6 in the disk 4. Arranged centrally of the two disks is a sleeve 7 in which is disposed a winged valve 8, the heads 9 and 10 of which are of a diameter to engage with the respective ends of the sleeve and thus limit the movement of the valve in two directions, for a purpose that will presently appear. The disk 3 is further provided with a depression 11, which, in conjunction with the sleeve, forms a water-well from which water is supplied to the steam-generating chamber 12. The sleeve constitutes a water-meter to gage the quantity of water fed to the steam-generating chamber, and is automatically operated by gravity, when the engine exhausts, to perform its function, and in order to vary the capacity of the meter, as may be required, fillers 13 may be employed, water being supplied to the well from any suitable source not necessary to be shown.

Extending upward from the head 2, and preferably integral therewith, is a cylindrical chamber 14, which constitutes the carbureter and to which hydrocarbon is supplied from a pumping chamber 15 formed between the inner wall of the cylinder and the chamber 14. In order to establish passage between the chambers 14 and 15, the head 2 is provided in its upper face with a circular trough 16 surrounding the lower end of the chamber 14, and that portion of the latter within the trough is provided with spaced ports 17 through which the liquid contained in the pumping and carbureting chambers circulates under the action of the piston. The liquid referred to may be diluted alcohol, or water with gasolene floating thereon, and which is supplied to the pumping chamber through a pipe 18, as clearly shown in Fig. 1.

The pump comprises a cylindrical extension or plunger 19 of the piston 20, and reciprocates in the chamber 15, packing-rings 21 at the lower portion of the plunger affording a liquid and gas-tight seal between the chamber 15 and the combustion-chamber 22. The plunger is provided with a circumferential interior channel 23 forming a hot-well to store surplus water to be utilized in cooling the piston. Arranged at the bottom of the hot-well is an annular tappet 24, and disposed at the top of the well is a second tappet 25 through which project the lower portion of the stems 26 of the exhaust-valve 27, which latter is an annulus, as shown in Fig. 5, and is disposed in a valve-chamber 27ˣ formed in the opposed faces of the two members of the piston-head. The lower end of each of the stems 26 carries an adjustable collar 28, which, as shown in Fig. 3, is threaded on the stem, and is held in the desired adjustment by a set-screw 29, the function of the series of collars being described in the explanation of the operation of the engine as a whole. The piston is formed with an interior circumferential channel 30 constituting an explosion-chamber, and which communicates with the combustion-chamber 22 through a series of circularly arranged ports 31, arranged in the under face of the piston, and clearly shown by dotted lines in Fig. 8. Passage between the chamber 30 and the steam-generating chamber is afforded by a series of circularly arranged ports 32, (Fig. 8), that are closed at proper intervals by an annular valve 33 rigid with a plurality of stems 34, (Fig. 6), that work in alined openings formed in the two walls of the explosion-chamber. The upper ends of the stems 34 fit loosely in openings in an annular valve 35, (Fig. 6), designed to close passage through the ports 32 on the working stroke of the piston and thus prevent any of the water in the steam-generating chamber from passing to the combustion-chamber.

In order to limit the upward movement of the valve 35 on the compression stroke of the piston, the upper ends of the stems 34 are provided with heads 36 that also serve as stops to contact with a series of circularly disposed adjustable tappets 37 depending from the underside of the upper piston-head, and that operate to unseat the valve 33 and thus open the ports 32 at the limit of the working stroke of the piston to permit the products of combustion from the exploded charge to enter the steam-generating-chamber and flash the water therein into steam. The piston is secured, as usual, to a piston-rod 38 the upper end of which is or may be provided with a well 39 to contain water for cooling purposes.

The means for supplying air to the carbureter consists of a series of circularly arranged pipes 40 that open into the trunk of the engine and project any desired distance upward into the chamber 14, the upper ends of these pipes being closed at certain intervals by thimble valves 41 that may be of any length and dip any desired distance into the liquid contained in the carbureter, thus to provide a seal at certain stages in the operation of the engine to prevent escape of aeriform fluid, and also to insure perfect mixture of the explosive compound. These valves fit loosely on the pipes and are of sufficiently greater internal diameter than the same to afford ready passage of air to the carbureter, and also to obviate any danger of binding. Communication between the carbureter and the combustion-chamber is secured by the provision of a series of circularly arranged ports 42 formed in the head of the chamber 14 adjacent to its walls, and over which is arranged an annular cup-shaped valve 43, (Fig. 7), the inner walls of which flare outward. Disposed within the valve 43 is a centrally countersunk valve 44 that operates to hold the valve 43 closed during a period of the compression stroke, and is of a diameter to fit snugly the flared walls of the latter valve when seated and thus prevent back-flashing. The valve 44, as will presently appear, is caused, when the pressure on the mixture in the carbureter is superior to that in the combustion-chamber, to be violently forced upward from its seat, and in order to guide it in its upward and return movements to insure proper seating, the piston-rod is provided, in this instance, with three equidistantly spaced grooves 45 that are engaged by splines 46 adjustably secured to the upper face of the valve 44, as shown in Fig. 9.

As a matter of precaution, and to insure the positive seating of the annular valve 33 before the explosive mixture enters the combustion-chamber, a circularly arranged series of tappets 47 is employed that work loosely in openings in the valve 44 and are provided with heads 48 that engage loosely with depressions in the head of the carbureter. Thus, if from any cause the valve 43 fails to lift at the proper time to close the annular valve 33, these tappets will contact with the stems 34 and secure the desired result. It is to be understood that the tappets will be of such height that they will bridge the space reserved for the final compression of the gaseous mixture.

Any suitable sparking means may be employed, that herein shown consisting of a plurality of circularly arranged spring-contacts 49 carried by the underside of the piston-head and arranged to engage with similarly disposed contacts 50 extending through and rigid with the head of the carbureting-chamber and also projecting loosely through the valve 44.

Having given a general description of the parts of the engine, an explanation of its operation in carrying out the method will now be furnished.

Let it be assumed that the piston is nearing the limit of its return or compression stroke as shown in Fig. 1. Under these conditions the exhaust-valve and thimble-valves are closed, and the valves 33, 43 and 44 are open. During this movement of the piston, the explosive mixture that was drawn into the carbureter on the previous stroke of the piston is highly compressed by the plunger 19 and is thoroughly mixed with air. On the initial compression stroke, the pressure on the mixture is negligible, but as the plunger descends, the pressure rapidly increases in the carbureting chamber until it is in excess of that in the combustion-chamber, whereupon the valve 43 will be violently forced from its seat and driven upward, causing the tappets 47 carried by the valve 44 to contact with the valve-stems 34 and thus close the valve 33 at the proper moment to prevent any escape of the gaseous mixture to the steam-generating chamber at the time it enters the combustion chamber. At this time the steam-generating chamber has a full charge of water which was supplied to it from the meter when the piston started on its working-stroke. The sparkers now come into contact and ignite the charge, and at this point the collars 28 are engaged by the tappet 25 with the result that the exhaust-valve is opened and the contents of the steam-generating chamber are permitted to escape, while at the same time the valve 8 drops by gravity and supplies a fresh charge of water to the chamber, as will readily be understood. As the operation of the engine on the compression stroke will be the reverse of that just described, an explanation thereof is deemed unnecessary.

A feature of the invention of the greatest importance is that by a determinate proportion between the internal areas of the combustion and carbureting chambers, the pressure in the latter may accurately be determined as desired. Thus if the liquid in the carbureter is only sufficient partly to fill it on the limit of the compression stroke of the piston, a less pressure will be secured than would result if the body of liquid were sufficient practically to fill the chamber on the said stroke.

I claim:

1. The method of operating internal combustion engines which consists in applying and exploding an explosive charge on one side of a piston, applying a charge of vaporizable fluid on the opposite side and introducing the heat and products of the exploded charge into the opposite end of the cylinder and vaporizing the charge therein.

2. The method of operating internal combustion engines which consists in applying to opposite sides of a piston a charge of explosive material and a charge of vaporizable fluid, exploding said explosive charge and applying the heat generated thereby directly to said fluid charge to vaporize the same within the cylinder.

3. The method of operating internal combustion engines which consists in applying to opposite sides of a piston a charge of explosive material and a charge of fluid, exploding said explosive charge, passing the heated products of the exploded charge through the piston into contact with the fluid charge, and thereby vaporizing the same.

4. The method of operating internal combustion engines which consists in introducing into the cylinder an explosive charge on one side of the piston and a charge of vaporizable fluid on the opposite side, exploding the explosive charge and applying the resulting gases and heated products of combustion directly to the vaporizable charge within the cylinder.

5. The method of operating internal combustion engines which consists in introducing into the cylinder an explosive charge on one side of the piston and a charge of vaporizable fluid on the opposite side, exploding the explosive charge and vaporizing the fluid charge by direct application thereto, within the cylinder, of the heat of the exploded charge.

In testimony whereof I affix my signature in presence of two witnesses.

ROBERT M. FRYER.

Witnesses:
R. M. ELLIOTT,
MARY E. BRANSON.

---

Copies of this patent may be obtained for five cents each, by addressing the "Commissioner of Patents, Washington, D. C."